(12) United States Patent
Gosz et al.

(10) Patent No.: US 7,988,578 B2
(45) Date of Patent: Aug. 2, 2011

(54) BELT TENSIONER ASSEMBLY

(75) Inventors: Rick G. Gosz, Oshkosh, WI (US); Mark A. Kubsh, Francis Creek, WI (US)

(73) Assignee: Patriot Universal Holdings, LLC., Hilbert, WI (US)

( * ) Notice: Subject to any disclaimer, the term of this patent is extended or adjusted under 35 U.S.C. 154(b) by 789 days.

(21) Appl. No.: 10/977,877

(22) Filed: Oct. 28, 2004

(65) Prior Publication Data

US 2005/0148419 A1      Jul. 7, 2005

Related U.S. Application Data

(60) Provisional application No. 60/515,052, filed on Oct. 28, 2003.

(51) Int. Cl.
*F16G 3/00*      (2006.01)

(52) U.S. Cl. .............. 474/253; 474/101; 474/255; 24/32

(58) Field of Classification Search ............... 474/101, 474/112, 133, 135, 136, 253, 255, 257; 24/31 R, 24/32, 33 R, 33 A, 37; 198/813
See application file for complete search history.

(56) References Cited

U.S. PATENT DOCUMENTS

| | | | | |
|---|---|---|---|---|
| 1,744,501 A | * | 1/1930 | Reichel et al. | 24/163 R |
| 4,481,695 A | * | 11/1984 | Koster et al. | 24/32 |
| 4,489,475 A | * | 12/1984 | Struttmann et al. | 29/525.11 |
| 4,634,412 A | * | 1/1987 | Satake | 474/244 |
| 4,798,562 A | * | 1/1989 | Matson et al. | 474/101 |
| 4,850,934 A | * | 7/1989 | Gibson et al. | 474/111 |
| 5,256,111 A | * | 10/1993 | Muth et al. | 474/101 |
| 5,820,503 A | * | 10/1998 | Bruchner et al. | 474/112 |
| 6,117,034 A | * | 9/2000 | Vine | 474/134 |
| 6,193,621 B1 | * | 2/2001 | McClosky | 474/101 |
| 6,575,858 B2 | * | 6/2003 | Green et al. | 474/133 |
| 6,913,553 B2 | * | 7/2005 | Chopra | 474/253 |
| 7,090,606 B2 | * | 8/2006 | Dec | 474/135 |
| 7,220,198 B2 | * | 5/2007 | Iida | 474/253 |
| 7,690,500 B2 | * | 4/2010 | Coers et al. | 198/844.2 |
| 2001/0046915 A1 | * | 11/2001 | Green et al. | 474/138 |
| 2003/0109342 A1 | * | 6/2003 | Oliver et al. | 474/134 |
| 2004/0009837 A1 | * | 1/2004 | Serkh et al. | 474/135 |
| 2008/0200295 A1 | * | 8/2008 | Schaefer | 474/255 |

* cited by examiner

*Primary Examiner* — Bradley T King
*Assistant Examiner* — Thomas Irvin
(74) *Attorney, Agent, or Firm* — Philip M. Weiss; Weiss & Weiss

(57) ABSTRACT

A belt tensioning device for use in a machine motion application.

4 Claims, 9 Drawing Sheets

BELT TENSIONER ASSEMBLY

RELATED APPLICATIONS

The present application claims priority to provisional patent application Ser. No. 60/515,052, filed Oct. 28, 2003.

FIELD OF THE INVENTION

This invention relates generally to a belt tensioning device for use in a machine motion application.

BACKGROUND OF THE INVENTION

Prior art machines have several drawbacks relating to lack of the ability to accurately tension a drive belt.

SUMMARY OF THE INVENTION

In accordance with the present invention, there is provided a belt tensioner for applying a desired tension to a belt. The belt tensioner includes a retainer for a first end of the belt, which may be in the form of a half pulley and a plate that is engaged with the half pulley. The plate is coupled to a tensioner body, such that the plate and the half pulley hold one end of the belt against the tensioner body. The belt tensioner further includes a second pulley coupled with the tensioner body. The second pulley is rotatable, and is configured to engage a second end of the drive belt. An adjustment wheel is coupled to the second pulley, and is configured to rotate the second pulley to place tension on the drive belt. The adjustment wheel includes an array of openings. The belt tensioner further includes a bracket coupled to the tensioner body. The bracket also includes an array of openings, that are configured to align with the array of openings of wheel adjustment. The belt tension is set with a torque wrench. When the proper torque is set (thereby establishing the correct tension), the operator installs a fastener into the adjusting wheel hole that aligns with a threaded hole in the tensioner body to lock the adjusting wheel in position.

An engagement member is configured to be inserted through one of the openings of the adjustment wheel and into an aligned one of the openings of the bracket. The engagement member is operable to hold the tension of the second pulley on the belt.

In accordance with another aspect of the invention, a food product molding machine comprises a mold plate having a plurality of cavities configured to receive a food product from a feed chamber/manifold assembly, and a mold plate drive assembly configured to linearly drive the mold plate between a fill position and a discharge position. The mold plate assembly includes a first belt cartridge assembly and a second belt cartridge assembly disposed on each side of the machine and coupled to each side of the mold plate. Each belt cartridge assembly includes a drive pulley, a series of idler pulleys, a drive belt wrapped around the drive pulley and series of idler pulleys, and a belt tensioner configured to control tension on the drive belt.

DETAILED DESCRIPTION OF THE PREFERRED EMBODIMENTS

The figures show a food product molding machine as an example of how to use the belt tensioner device of the present invention. However, this device can be used with other types of machines where a belt tensioner is required for applying a desired tension to a belt.

Figure 1:
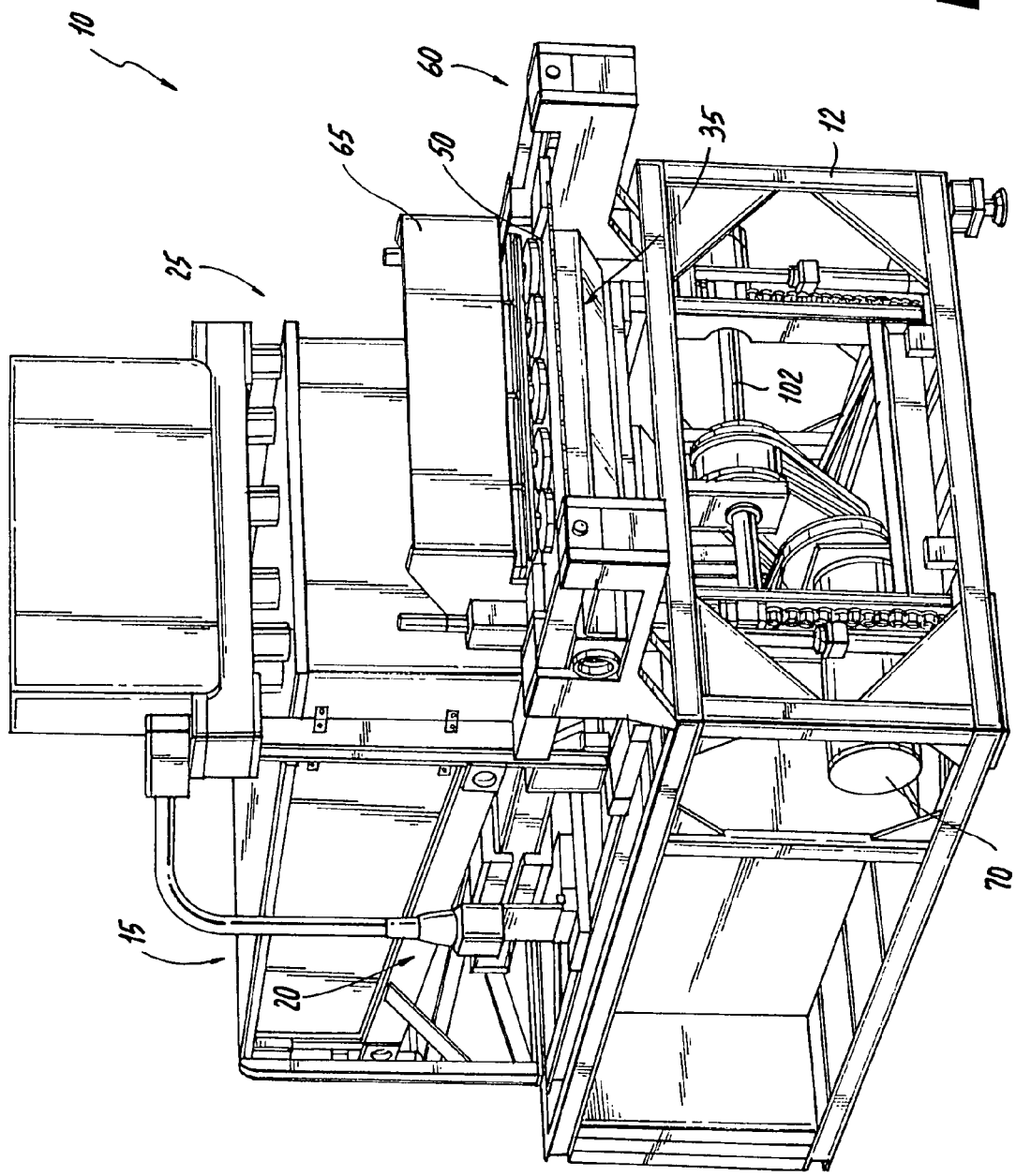
FIG. 1 is a perspective view of one embodiment of a food product molding machine in accordance with the present invention.
Figure 2:
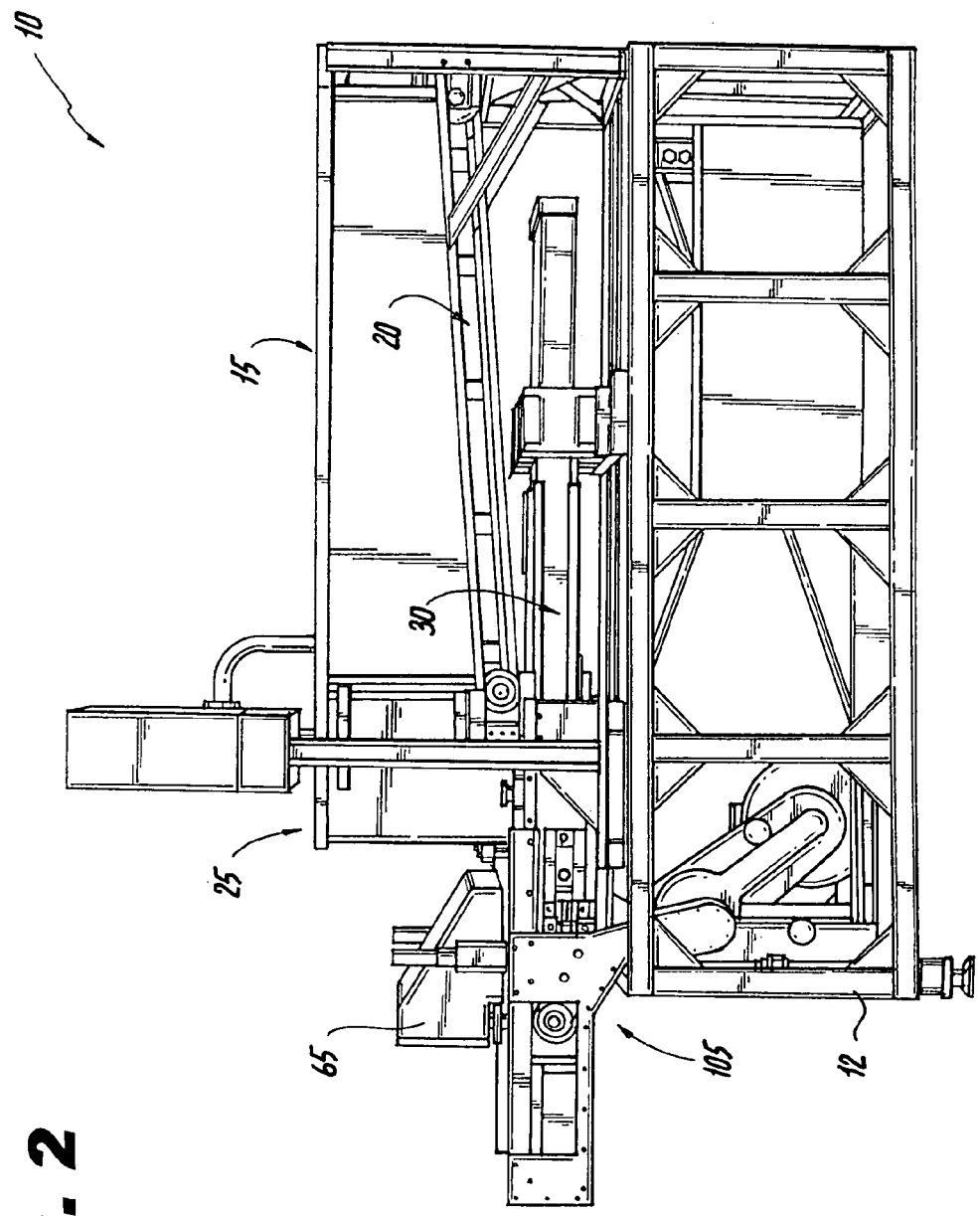
FIG. 2 is a side elevation view of the food product molding machine shown in FIG. 1.
Figure 3:
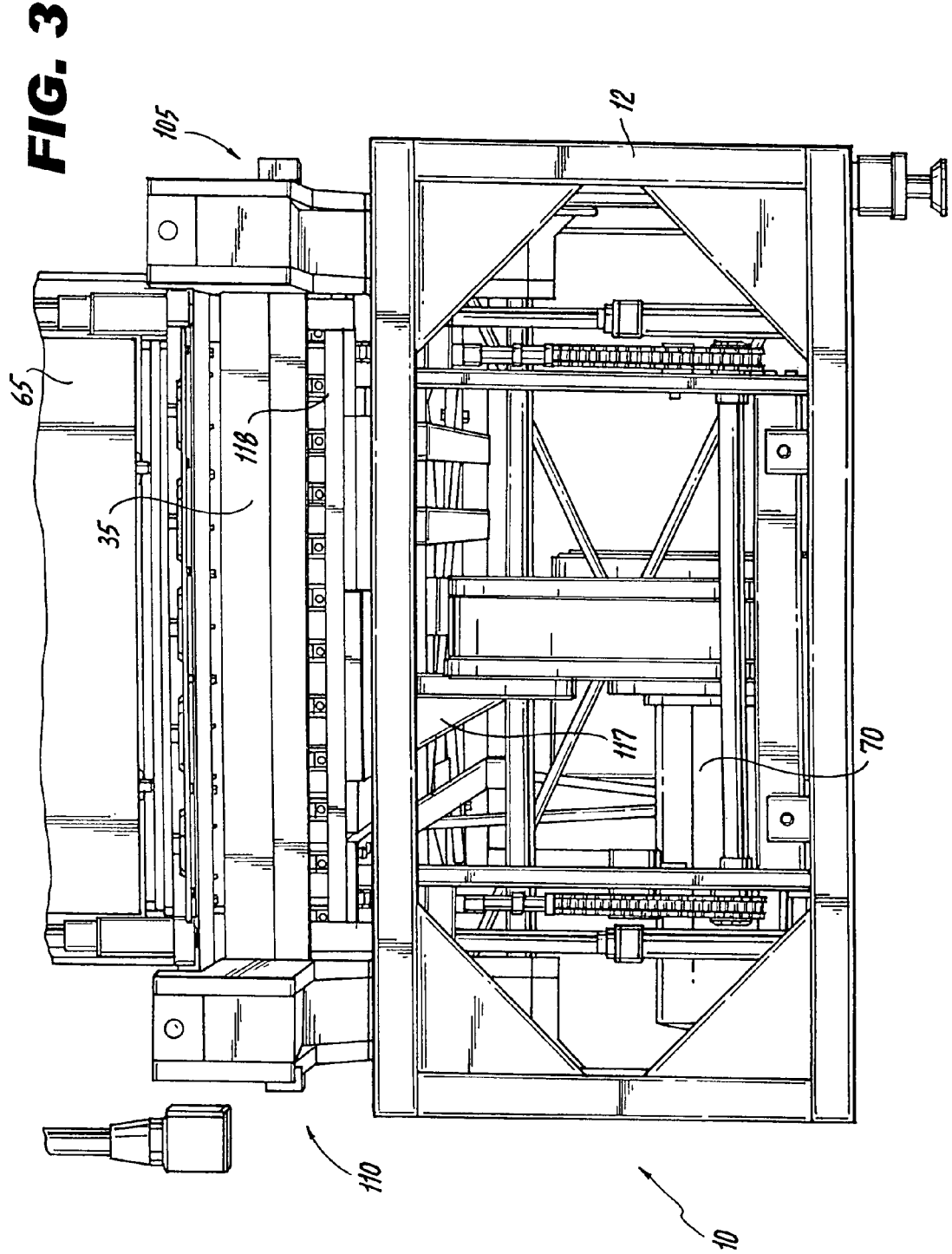
FIG. 3 is a detailed front view of a mold plate drive belt assembly shown in FIG. 1.
Figure 4:
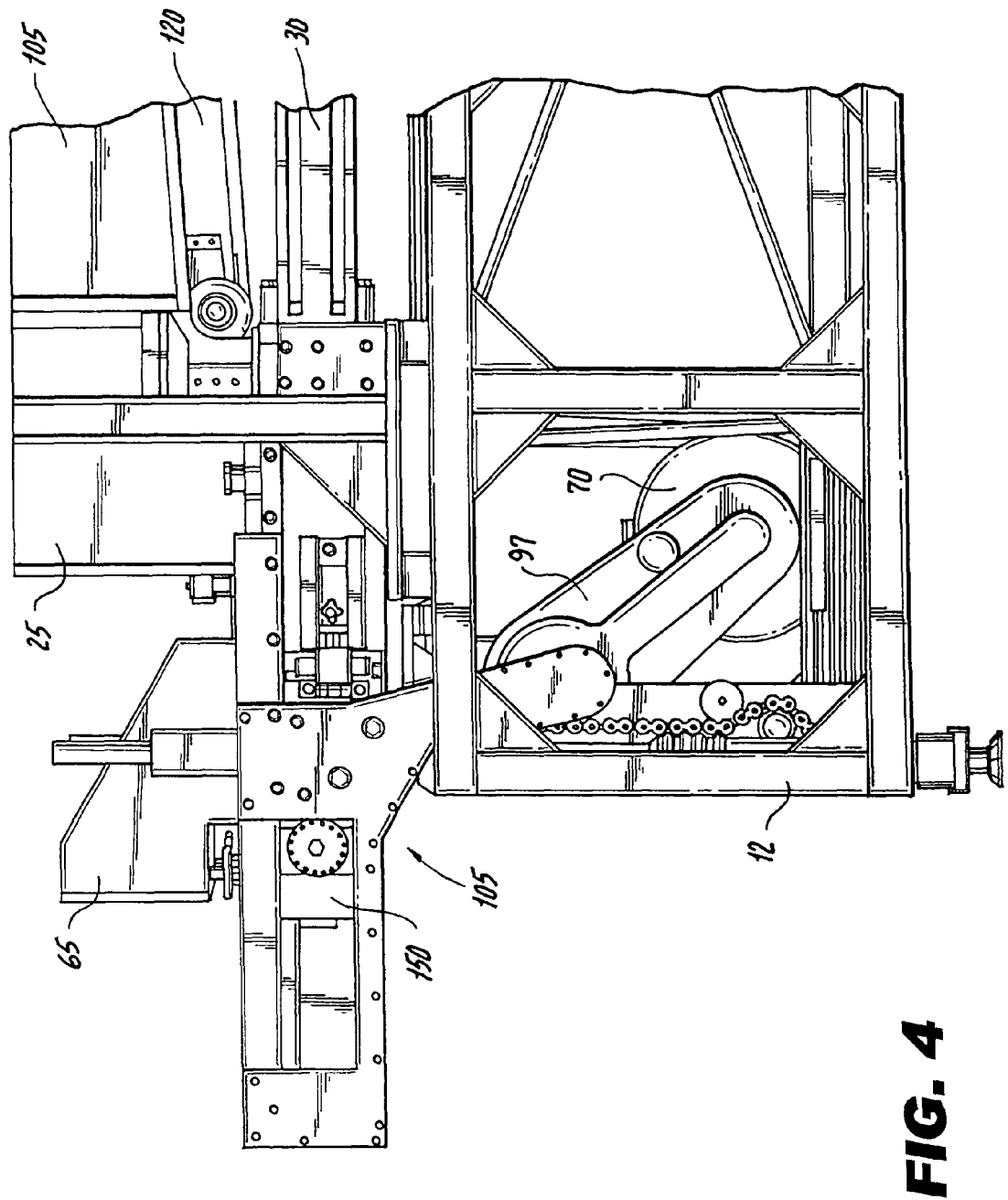
FIG. 4 is a detailed side elevation view of a mold plate drive belt assembly shown in FIG. 1.
Figure 5:
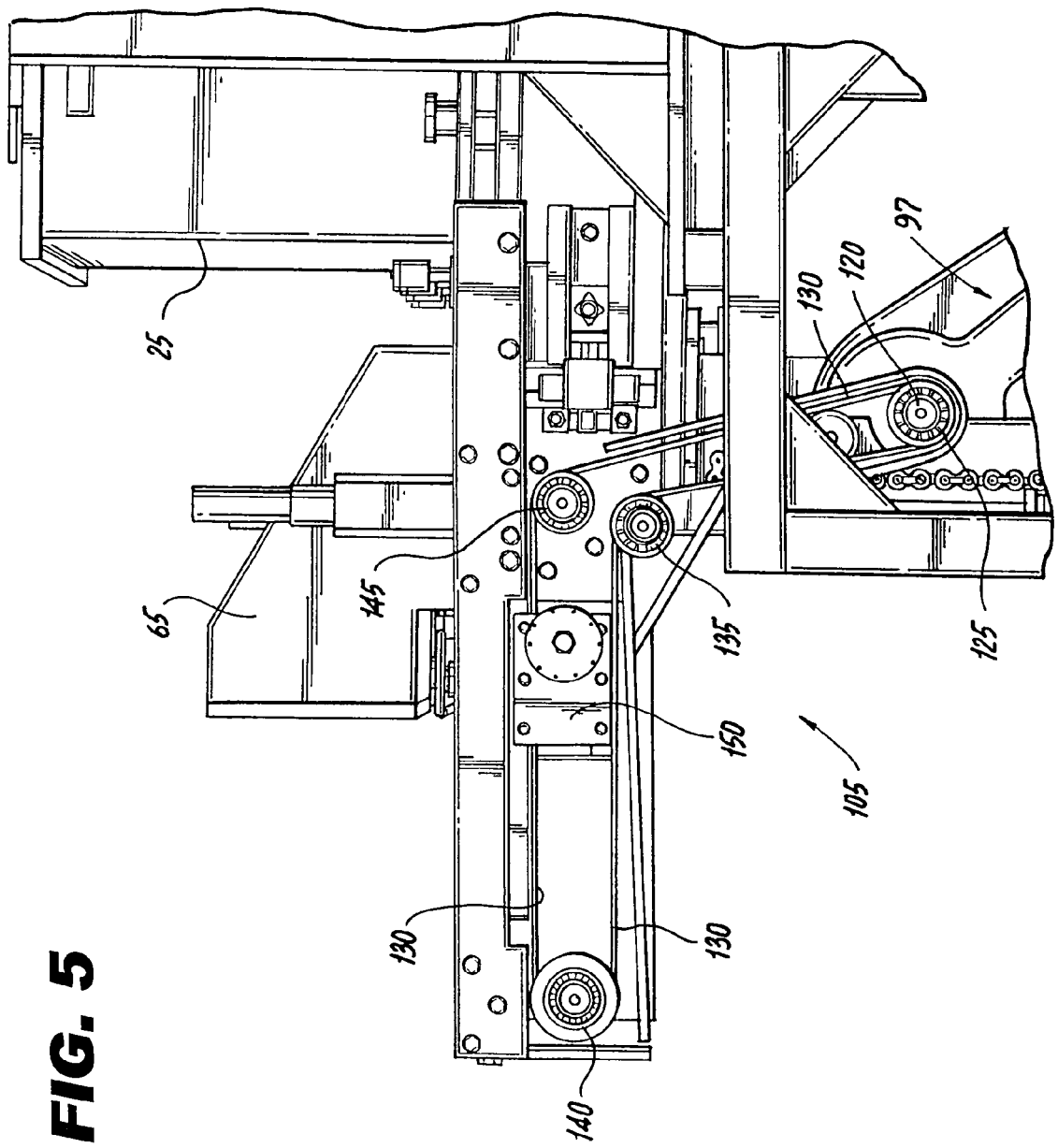
FIG. 5 is a detailed side view of the mold plate drive belt assembly in FIG. 1 with a side housing panel removed.
Figure 6:
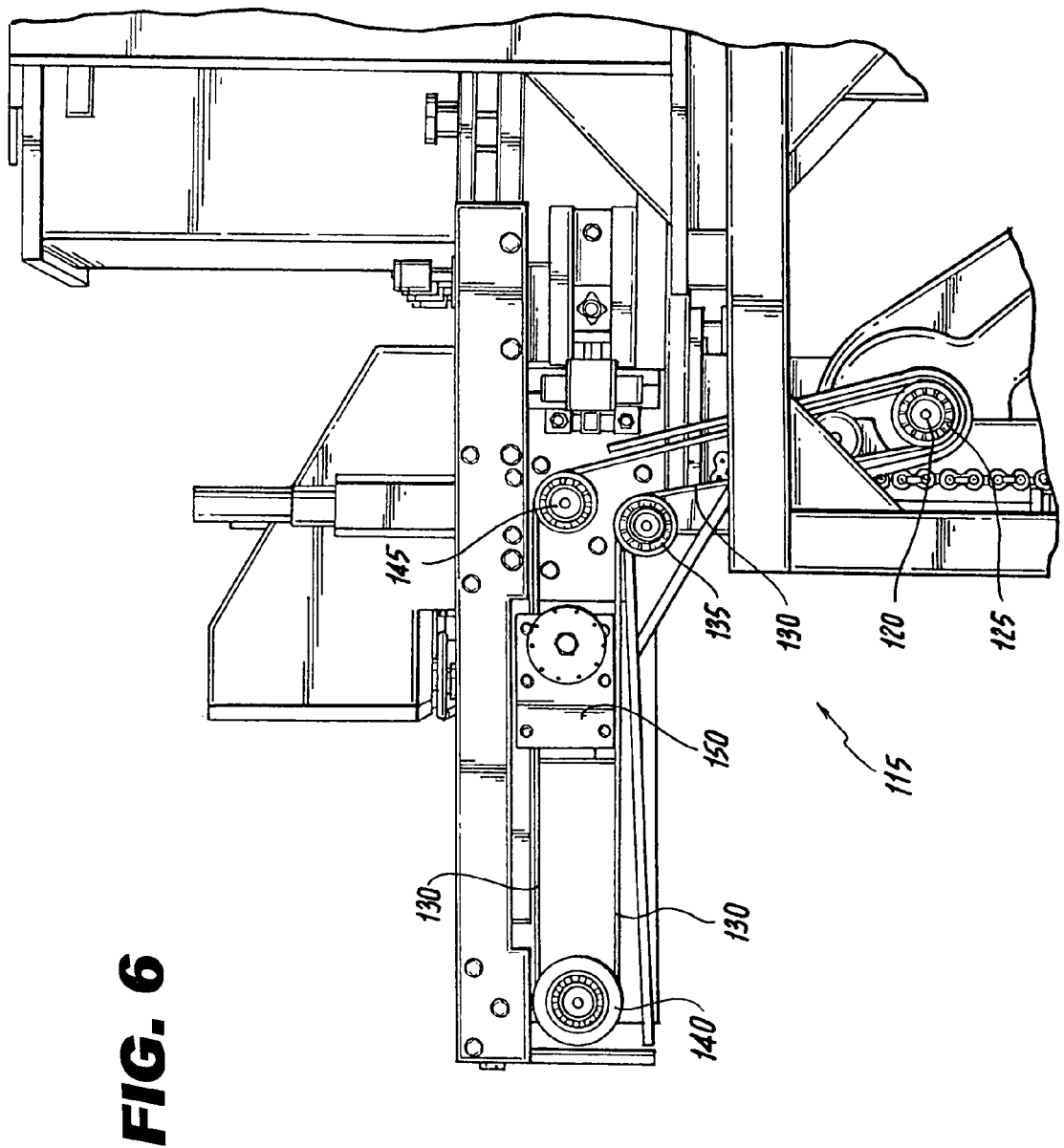
FIG. 6 is a detailed side view of the mold plate drive belt assembly in FIG. 5.
Figure 7:
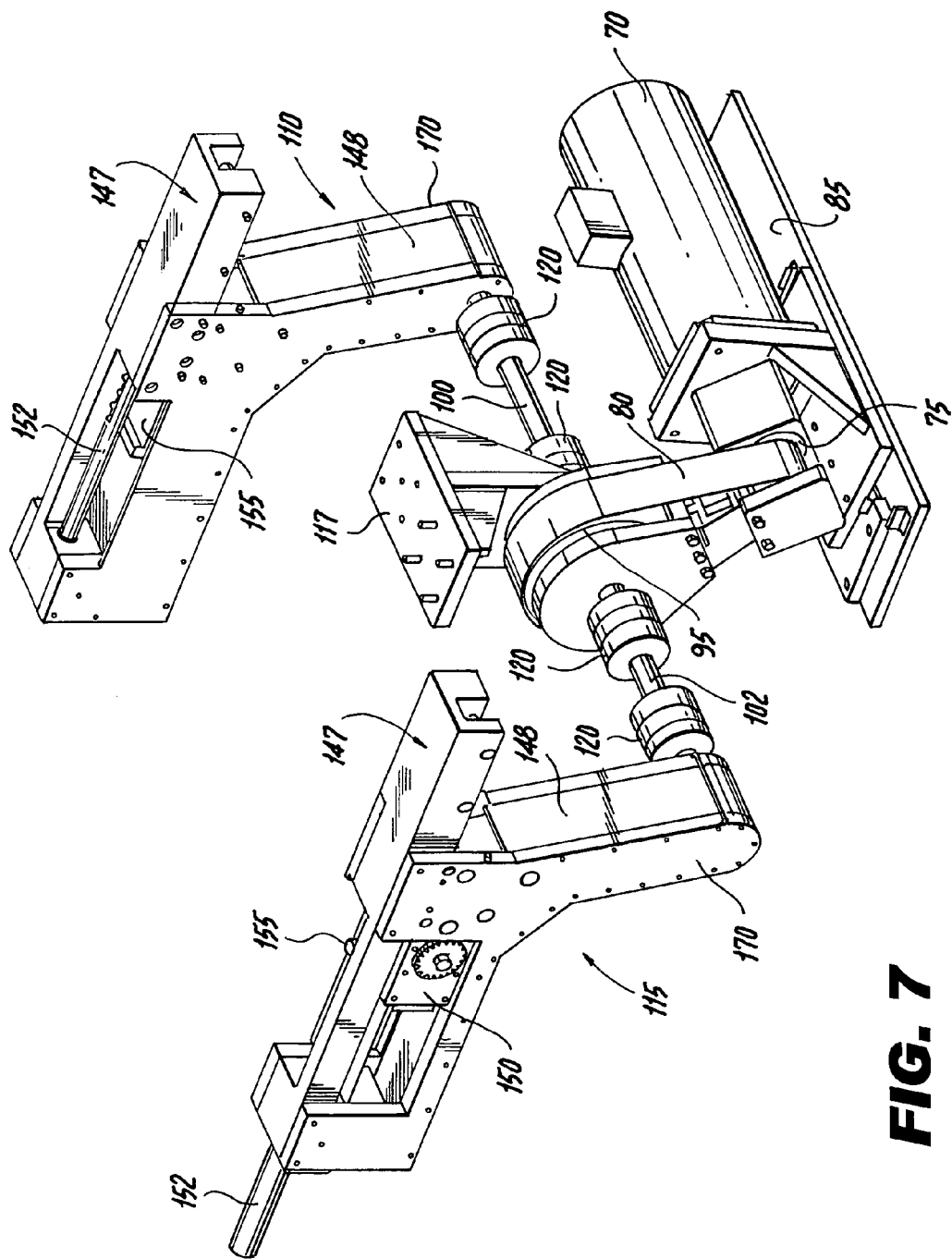
FIG. 7 is a perspective of the mold plate drive assembly removed from the machine shown in FIG. 1.
Figure 8:
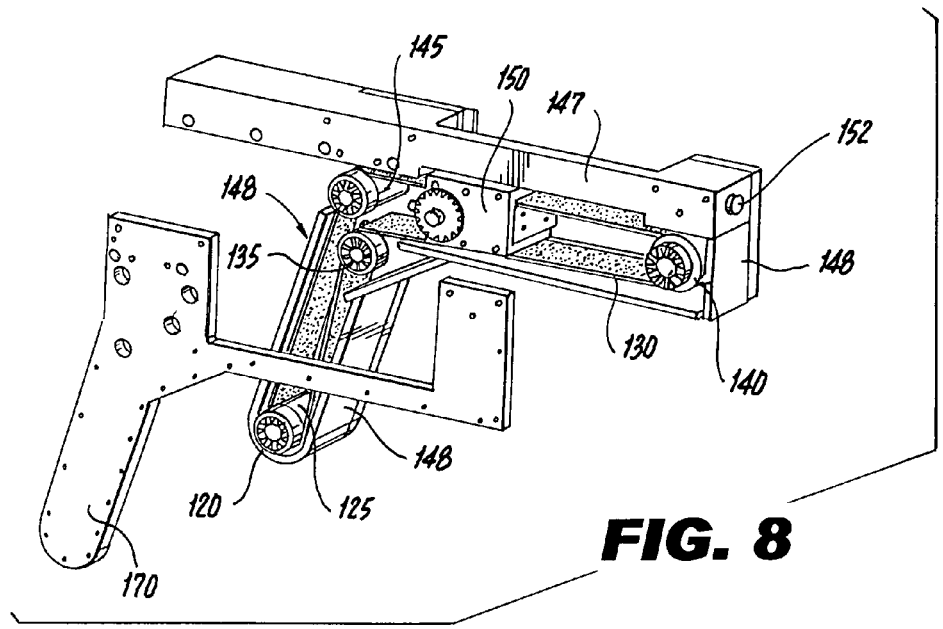
FIG. 8 is a detailed perspective view of a drive cartridge assembly and removable panel of the drive assembly in FIG. 7.
Figure 9:
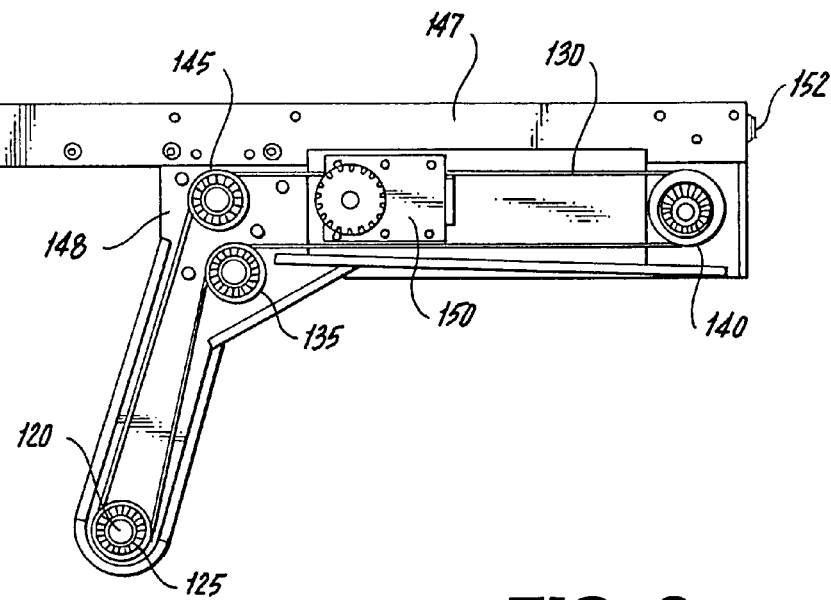
FIG. 9 is a detailed side elevation view of the drive cartridge assembly in FIG. 7 with the removable panel removed.
Figure 10:
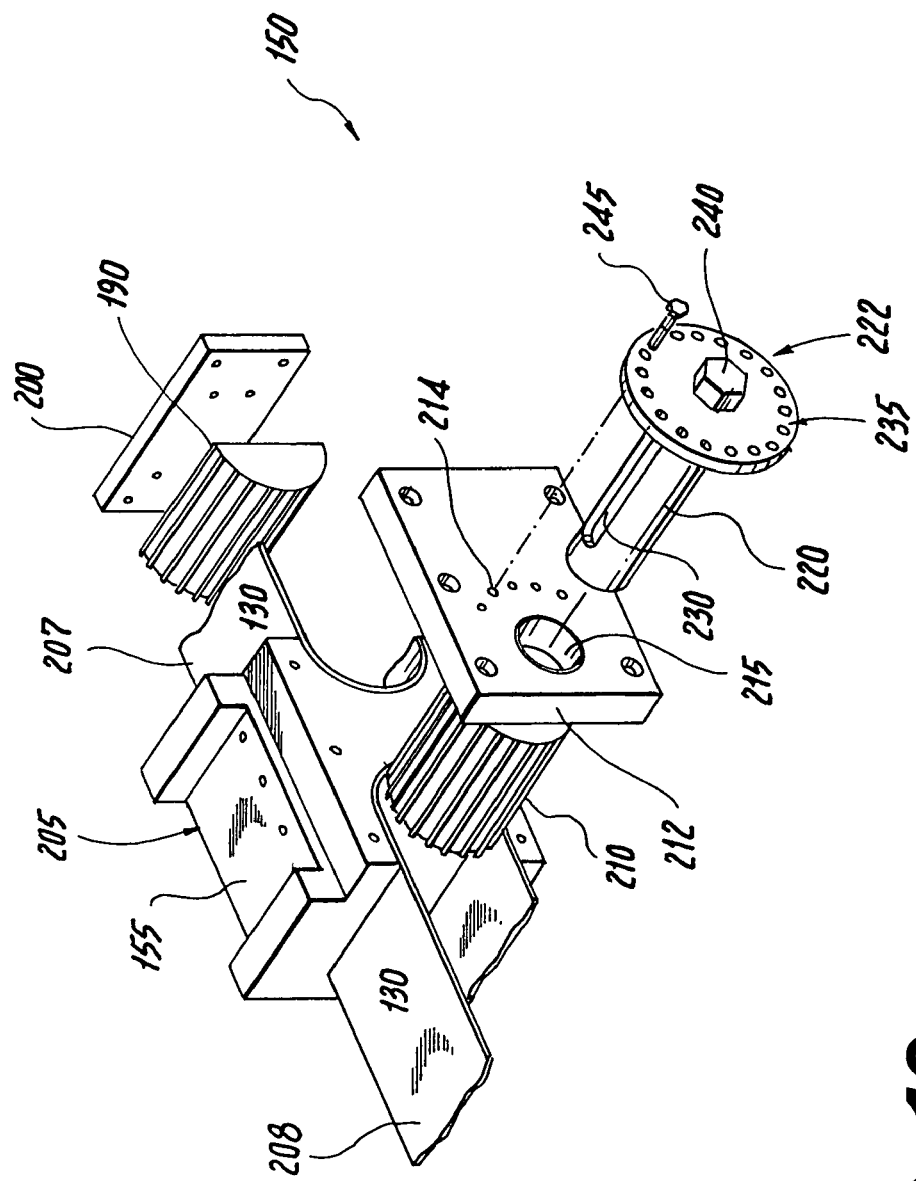
FIG. 10 is an exploded perspective view of the belt tensioner assembly incorporated in the drive cartridge assembly as shown in FIGS. 7-9.

As shown in FIG. 10, the belt tensioner assembly 150 includes a first retainer member, in the form of a pulley 190 coupled to a clamping plate 200. The first pulley 190 and clamping plate 200 are coupled to a tensioner body 205. First pulley 190 is in the form of a half pulley with a plurality to teeth configured to engage the plurality of teeth of the drive belt 130. The first pulley 190 is coupled to the clamping plate assembly 200 by one or more fasteners (e.g., bolt and nut, etc.).

A first end 207 of the drive belt 130 is coupled to the tensioner body 205 by first pulley 190 and clamping plate 200. The first pulley 190 and the clamping plate assembly 200 are coupled by one or more fasteners (e.g., bolt and nut, etc.) to the tensioner body 205. The first pulley 190, the clamping plate assembly 200, and tensioner body 205 are configured to hold the end 207 of the drive belt 130 to the belt tensioner assembly 150. The type of the first pulley can vary, and it is understood that the first pulley may be replaced with any satisfactory retainer that engages the end 207 of the belt 130 and maintains it in position relative to the tensioner body 205.

The other end 208 of the drive belt 130 is inserted through the assembly of idler pulleys 135, 140 and 145 and drive pulley 125 and back around to a second pulley 210. A preferred second pulley 210 includes a plurality of teeth configured to engage and provide tension to the drive belt 130.

A mount bracket 212 is fixedly coupled to the tensioner body 205 by a plurality of fasteners through openings along the perimeter of the bracket 212. The bracket 212 includes a threaded hold array 214 around an opening 215. The opening 215 aligns with an opening through the second pulley 210 and is configured to receive a tension wheel shaft 220. The second pulley 210 further includes a keyway (not shown) configured to receive a key 230 on a wheel shaft 220 of a tension wheel 222. The tension wheel 222 includes a threaded hold array 235 that aligns with the tension hole array 214 of the bracket 212. The threaded hole array 235 is configured to adjust tensional force on the drive belt 130 in 1-degree increments. A tension wheel nut 240 couples the tension wheel 212 to the shaft 220. A tension wheel engagement member, in the form or a threaded bolt 245, is configured to be inserted through one of the array of openings 235 on the tension wheel 222 and into an aligned opening of the array 214 in the bracket 212.

In operation, the second end 208 of the drive belt 130 is engaged with second pulley 210. The tension wheel 210 is rotated to take up slack in the drive belt 130. An operator then rotates the tension wheel 222 using any satisfactory tool, such as a torque wrench engaged with wheel nut 240, until the proper torque is applied on the drive belt 130. The tension wheel bolt 245 is then inserted into and through one of the holes 235 that is in direct alignment with one of the holes 214 in bracket 212, and is tightened into the hole 214 to maintain the rotational position of the second pulley 210 relative to tensioner body 205. In this manner, the operator is able to quickly and easily apply a desired amount of tension to drive belt 130.

Alternatively, the tension wheel half of the belt tensioner assembly can be installed in an application where the belt is clamped at both ends and the belt remains stationary (e.g., a stationary belt and pinion drive). Alternatively, the belt tensioner assembly 150 can be fixedly mounted to a stationary frame. Furthermore, the belt tensioner assembly 150 can be configured without the pulley 190 and clamping plate 200 such that the tensioning body is rigidly fixed to a frame or wall, and the tensioning pulley 208 is used to tension only one end of a belt.

In operation, the drive belt 130 in each drive cartridge 110 and 115 is tensioned around the idler pulleys 135, 140, and 145 and the drive pulley 125 by the belt tensioner 150. A controller (not shown) for the mold plate drive assembly 60 receives signals representative of the position of the mold plate 50. The controller can be configured to receive various signals from pressure sensors, limit switches, etc. representative of the pressure of the food product forced in the cavity of the mold plate 50 or the position of the mold plate 50. The controller provides control signals to the motor 70 to control the directional drive of the pulley 75. Initially, the motor 70 drives rotation of the drive pulley 75 and attached drive belt 80, drive shafts 100 and 102, and drive pulleys 120 in each drive cartridge 105 and 110 in a first rotational direction to cause the drive belt 130 to move the belt tensioner 150, guide rod 152, drawbar guide 155, drawbar 160, and mold plate 50 to move in a first linear motion toward the fill slot of the fill plate. Upon filling of the cavity with food product to the designated pressure or for the designated dwell time, the controller signals the motor 70 to change direction. The motor 80 rotates the drive pulley 75 and attached drive belt 80, drive shafts 100 and 102, and drive pulleys 120 in a similar fashion to cause the drive belt 130 to move the belt tensioner 150, guide rod 152, drawbar guide 155, drawbar 160 of each drive cartridge 110 and 115 in a second linear direction such that the mold plate 50 slides away from the fill slot and toward a discharge position at the knockout assembly 65. The knockout assembly 65 discharges or releases the formed food product patties from the cavities of the mold plate 50. Thereby, the mold drive assembly 60 drives cyclic reciprocation of the mold plate 50 between the fill position and the discharge position as described above.

While the belt tensioner of the present invention has been shown and described in connection with a food product molding machine, it should be understood that the belt tensioner may be used in any application that requires tensioning of a belt and which enables a tensioner to remain in engagement with the belt in operation. This type of tensioner can thus be used in reciprocating motion machines, as well as certain types of indexing or continuous motion machines in which a tensioner can remain in engagement with the belt during operation. The present invention encompasses multiple belt drive systems running in parallel to achieve equilibrium between assemblies. Gatry, Shuttle or any application requiring parallel motion while driven by single or multiple belts, chains or cables is included under the present invention. The tensioner of the present invention allows precise setting of tension to accurately align devices running in parallel.

The above discussion, examples, and embodiments illustrate our current understanding of the invention. However, since many variations of the invention can be made without departing from the spirit and scope of the invention, the invention resides wholly in the claims hereafter appended.

We claim:

1. A belt tensioner assembly, comprising:
   a drive belt having a first end and a second end;
   a retainer for said first end of said belt, wherein said retainer is a half pulley and a plate engaged with said half pulley;
   a tensioner body, wherein said retainer holds said first end of said belt against said tensioner body;
   a rotatable pulley coupled with said tensioner body, wherein said rotatable pulley engages a second end of said belt;
   an adjustment member coupled to a second pulley, wherein said adjustment member includes an array of openings, and wherein said adjustment member rotates said rotatable pulley to place tension on the belt;
   a bracket coupled to said tensioner body, wherein said bracket includes an array of openings aligned with the array of openings of said adjustment member; and
   an engagement member inserted through aligned openings of the array of the adjustment member and the array of the bracket, wherein said engagement member holds the tension of the rotatable pulley on the belt.

2. The belt tensioner of claim 1 wherein said tensioner sets tension to align devices running in parallel.

3. The belt tensioner of claim 1 wherein said belt tension is set with a torque wrench.

4. A belt tensioner assembly comprising:
   a tensioner body;
   a first retainer member, wherein said retainer member is coupled to said tensioner body;
   a drive belt having a first end and a second end, said drive belt being coupled to said tensioner body;
   said first retainer member and said tensioner body holding said first end of said drive belt to said belt tensioner assembly;
   said second end of said drive belt inserted through an assembler of idler pulleys and drive pulleys and back around to a second pulley;
   a mount bracket coupled to said tensioner body, said mount bracket comprising an array of threaded holes spaced around an opening;
   said opening aligning with an opening through said second pulley to receive a tension wheel shaft of a tension wheel;
   said second pulley comprising a keyway configured to receive a key of said tension wheel shaft;
   said tension wheel comprising an array of threaded holes configured to align with the array of threaded holes of said bracket;
   said tension wheel rotating relative to said bracket to adjust a tensional force on said drive belt.

* * * * *